US011798433B2

(12) United States Patent
Loguda-Summers et al.

(10) Patent No.: US 11,798,433 B2
(45) Date of Patent: Oct. 24, 2023

(54) SYSTEMS AND METHODS FOR INJECTION PLACEMENT TRAINING

(71) Applicant: A.T. Still University of Health Sciences, Kirksville, MO (US)

(72) Inventors: Debra Lynn Loguda-Summers, Kirksville, MO (US); Zachary Corey Headman, Sandy, UT (US); Marcus Christian Matson, Ogden, UT (US); James Andrew Carroll, Kirksville, MO (US)

(73) Assignee: A. T. Still University of Health Sciences, Kirksville, MO (US)

( * ) Notice: Subject to any disclaimer, the term of this patent is extended or adjusted under 35 U.S.C. 154(b) by 1052 days.

(21) Appl. No.: 16/594,445

(22) Filed: Oct. 7, 2019

(65) Prior Publication Data

US 2021/0104176 A1 Apr. 8, 2021

(51) Int. Cl.
*G09B 23/30* (2006.01)
*G09B 23/28* (2006.01)
*B33Y 80/00* (2015.01)
*B33Y 70/00* (2020.01)
*B29C 39/10* (2006.01)
*B29L 31/40* (2006.01)
*B29K 655/02* (2006.01)
*B29K 675/00* (2006.01)

(52) U.S. Cl.
CPC ............ *G09B 23/285* (2013.01); *B29C 39/10* (2013.01); *B33Y 70/00* (2014.12); *B33Y 80/00* (2014.12); *B29K 2655/02* (2013.01); *B29K 2675/00* (2013.01); *B29L 2031/40* (2013.01)

(58) Field of Classification Search
CPC ....... G09B 23/28; G09B 23/285; G09B 23/30
See application file for complete search history.

(56) References Cited

U.S. PATENT DOCUMENTS

| 5,839,904 | A  | * | 11/1998 | Bloom  | G09B 23/285 434/272 |
| 7,306,465 | B2 | * | 12/2007 | White  | G09B 23/285 434/268 |
| 7,621,749 | B2 | * | 11/2009 | Munday | A61M 5/427 434/262 |
| 8,408,920 | B2 | * | 4/2013  | Speller| G09B 23/285 434/267 |
| 9,514,658 | B1 | * | 12/2016 | Hart   | B29C 70/021 |

(Continued)

OTHER PUBLICATIONS

University of Washington—Seattle, Team Epidural. "Educational Model for Thoracic Epidural Procedure". Screenshot, 2pgs., Oct. 29, 2016, thingiverse.com.

*Primary Examiner* — Kurt Fernstrom
(74) *Attorney, Agent, or Firm* — Jennings, Strouss & Salmon, PLC (57) ABSTRACT

Systems and methods are disclosed for an injection training model that includes a base structure, an anatomical subassembly mechanically secured to the base, and a ballistic gel structure. The anatomical subassembly includes a first set of 3D-printed components manufactured from a first material, and a second set of 3D-printed components manufactured from a second material, wherein the first material has a greater stiffness than the second material. The ballistic gel structure encapsulates the anatomical subassembly and is transparent, repairable, and inorganic.

20 Claims, 10 Drawing Sheets (56) References Cited

U.S. PATENT DOCUMENTS

| | | | | |
|---|---|---|---|---|
| 10,854,111 B2* | 12/2020 | Bova | ............... | G09B 23/285 |
| 2009/0291421 A1* | 11/2009 | Duprez | ............ | G09B 23/28 |
| | | | | 434/262 |
| 2009/0298034 A1* | 12/2009 | Parry | ............... | G09B 23/30 |
| | | | | 434/274 |
| 2015/0294599 A1* | 10/2015 | Nitsche | ............... | G09B 5/00 |
| | | | | 434/262 |
| 2018/0218649 A1* | 8/2018 | Wucherer | ........ | G09B 23/286 |
| 2018/0350266 A1* | 12/2018 | Garcia | ............. | G09B 23/34 |
| 2018/0357931 A1* | 12/2018 | Mathaneswaran | ..... | G09B 23/30 |
| 2019/0027064 A1* | 1/2019 | Nelson | ............ | G09B 23/30 |

* cited by examiner

SYSTEMS AND METHODS FOR INJECTION PLACEMENT TRAINING

TECHNICAL FIELD

The present invention relates, generally, to medical training systems, and in particular, to injection placement training systems.

BACKGROUND

Neuraxial injection procedures are widely used in connection with analgesic and anesthetic pain management techniques. In general, such injections require the proper placement of a needle between vertebrae followed by the delivery of medication into the epidural space or the subarachnoid space, depending upon the nature of the procedure. Such injections are often used, for example, in connection with cervical, lumbar, and pelvic procedures.

To ensure that practitioners and residents master these injection techniques, relatively expensive training systems have been developed that allow a student to practice injection placement on anatomical models and, through repetitive practice, develop the muscle memory required to become confident when attempting such injections on actual patients.

Currently known injection training models are unsatisfactory in a number of respects. For example, prior art lumbar puncture and epidural training systems often rely on the use of expensive commercial trainers and are tailored to a relatively narrow range of injection procedures.

In addition, many injection training models incorporate organic, collagen-based ballistic gel materials to simulate human body density (e.g., NATO 20% or 10% gel, as is known in the art). Such ballistic gel materials are biodegradable and, as a result, are prone to rotting and/or mold growth within a relatively short time span. Further, such traditional ballistic gel is undesirable because the resulting models are generally not reusable or repairable and have a hazy, yellow appearance that makes it difficult for a student to view the needle tip position beyond a certain depth.

Furthermore, currently known commercial trainers generally only provide learning in the context of one type of anatomy, i.e., a nominal body type (not overweight, perfect spine, etc.).

Finally, commonly known injection training models often include internal features that do not properly simulate the mechanical feedback that a student will experience under real-life conditions—e.g., the use of poured silicone to simulate the epidural space in some anatomical models.

Accordingly, there is a long-felt need for less expensive, reusable, and more lifelike injection placement training models that can be used for a greater range of injection procedures and anatomies.

SUMMARY OF THE INVENTION

Various embodiments of the present invention provide improved systems and methods for injection placement training. In one embodiment, an injection training model includes a base structure, an anatomical subassembly mechanically secured to the base structure (e.g., a cervical, lumbar, or pelvic structure), and an inorganic ballistic gel structure. The anatomical subassembly includes a first set of 3D-printed components (e.g., vertebrae, ilia, sacrum, etc.) manufactured from a first material, and a second set of 3D-printed components (e.g., nerves, discs, and vascular structures) manufactured from a second material, wherein the first material has a greater stiffness than the second material. In some embodiments, the organic ballistic gel structure encapsulates the anatomical subassembly and is transparent, repairable, and inorganic. In other embodiments, a clear gel is used for initial instruction and a translucent or opaque material is later used to provide a more lifelike model.

In accordance with one embodiment, the anatomical subassembly includes a human lumbar structure, the first set of 3D-printed components includes a plurality of vertebrae, and the second set of 3D-printed components includes a plurality of lumbar discs.

In accordance with another embodiment, the anatomical subassembly includes a human cervical structure, the first set of 3D-printed components includes a plurality of vertebrae, and the second set of 3D-printed components includes a plurality of lumbar discs, at least one vascular structure, and a plurality of nerve structures.

In accordance with another embodiment, the anatomical subassembly includes a human pelvic structure, the first set of 3D-printed components includes a plurality of, pelvic bones or the like, and the second set of 3D-printed components includes a plurality of discs, at least one vascular structure, and a plurality of nerve structures.

In accordance with another embodiment, the anatomical subassembly further includes a thecal sac structure comprising a sealed tubular body having an inner chamber substantially filled with a liquid and/or an epidural space structure in which the tubular body is filled with air.

BRIEF DESCRIPTION OF THE DRAWING FIGURES

The present invention will hereinafter be described in conjunction with the appended drawing figures, wherein like numerals denote like elements, and.

DETAILED DESCRIPTION OF PREFERRED EXEMPLARY EMBODIMENTS

The following detailed description of the invention is merely exemplary in nature and is not intended to limit the invention or the application and uses of the invention. Furthermore, there is no intention to be bound by any theory presented in the preceding background or the following detailed description.

Various embodiments of the present invention relate to systems and methods for inexpensive, re-usable, and life-like injection training models that incorporate inorganic ballistic gel materials and 3D printed internal polymeric components.

As a preliminary matter, while many of the systems and methods of the present invention are described in the context of specific human anatomical structures (e.g., pelvic, cervical, and lumbar models), the invention is not so limited, and may be employed for producing injection training models that simulate a wide range of injection scenarios and anatomical structures (including both human and non-human structures).

Many of the components described below are produced through the use of 3D-printing. In that regard, the term "3D printing" as used herein (e.g., in connection with the printing of discs, nerves, vascular structures, vertebrae, and the like) refers to any form of additive manufacturing technique employing a material, such as acrylonitrile butadiene styrene (ABS), nylon, high-density polyethylene (HDPE), polyvinyl alcohol (PVA), or thermoplastic polyurethane (TPU), to create a 3D geometric structure through the progressive addition of material layers based on a previously generated digital model. In accordance with various embodiments, the material is provided in the form of filament configured to be used for fused deposition modeling (FDM). The invention is not so limited, however, and contemplates any material or combination of materials suitable in producing suitable anatomical structures based on 3D digital models. The general nature of 3D printing machines and 3D computer models (including the various file types used in connection with such models) are well known, and need not be described in detail herein.

Figure 1:
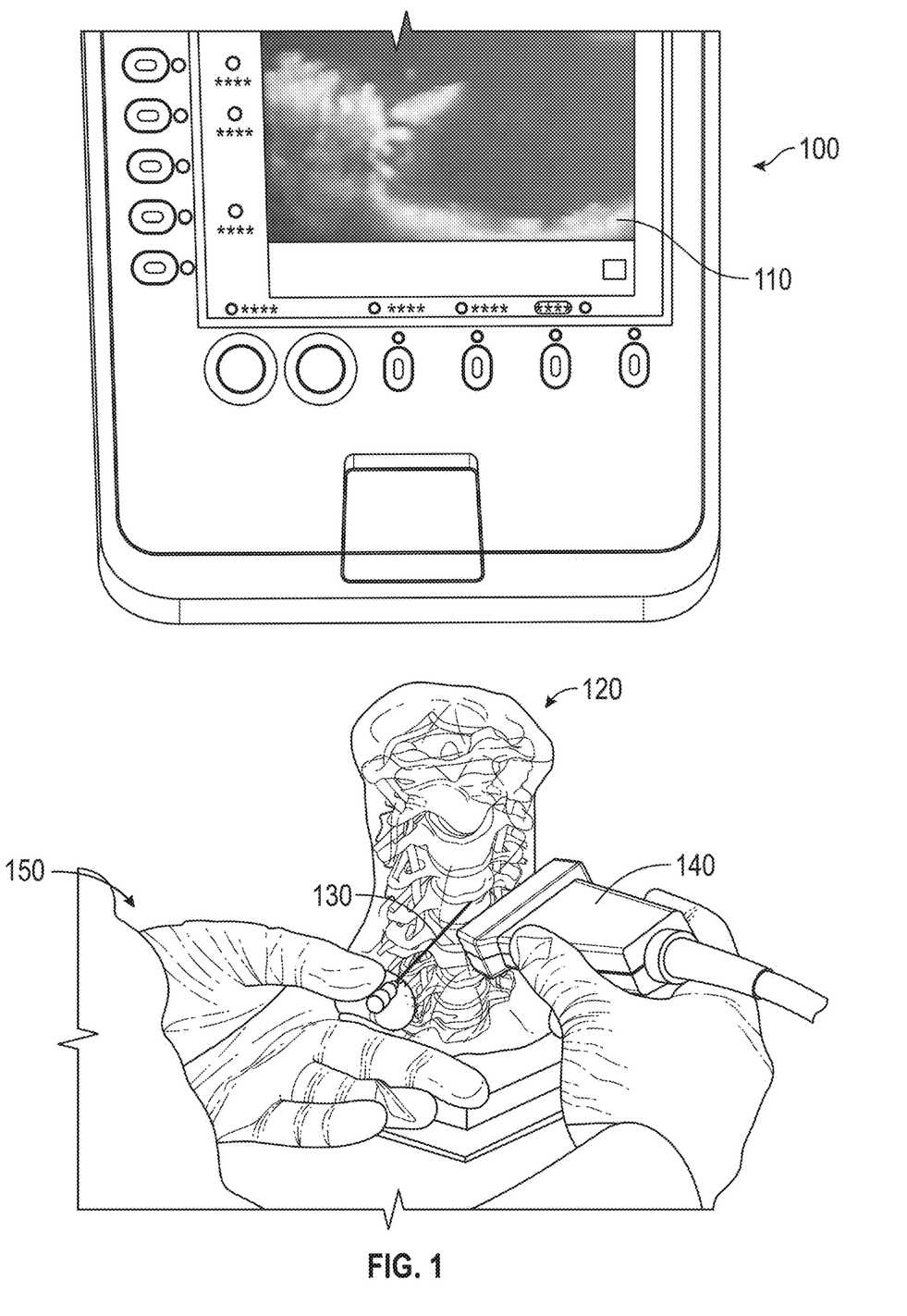
FIG. 1 depicts the use of an exemplary injection training model in accordance with various embodiments.

Referring now to the example illustrated FIG. 1, the injection training models of the present invention may be used in a training scenario that includes, initially, the use of an ultrasound system. More particularly, a user 150 (e.g., a student, resident, intern, etc.) interacts with an injection training model ("training model" or simply "model") 120 by gradually inserting a needle 130 into to model 120 while monitoring placement of the needle 130 using an ultrasound transducer 140 communicatively coupled to a monitor 100. Monitor 100 provides user 150 with an image 110 that, with proper training, allows user 150 to determine the position of the end of needle 130 relative to the anatomical structure enclosed within the ballistic gel material of model 120. Training in this way allows user 150 to develop the "muscle memory" necessary to insert needle 130 to the correct position in an actual human patients without the use of ultrasound monitor 100.

While the details of particular injection training models will be described in further detail below, FIGS. 2A and 2B together illustrate, in a general sense, the various steps 200 used to manufacture an injection training model in accordance with various embodiments.

As illustrated, the process starts with manufacturing, using 3D-printing technology, the various components (251, 252, 253) that will be used in assembling the model. Thus, for example, in step 201, a first set of structures (251) are manufactured from a first material (e.g., a relatively flexible material such as TPU). Such structures might include, for example, various discs, nerves, and vascular structures. Subsequently, in step 202, a second set of structures (252) are 3D-printed using a second, stiffer material such as ABS. Structures manufactured with this material might include, for example, vertebrae, the ilia, the sacrum, and other structures that have a bone-like hardness.

As mentioned above, the stiffness (Young's modulus) of the first set of structures is lower than the stiffness of the second set of structures. In one embodiment, the first and second materials are, respectively, TPU (having a stiffness of about 25.0-50.0 MPa) and ABS (having a stiffness of about 1.5-2.5 GPa). Thus, the stiffness of the second material in this example is approximately 50 times that of first material.

It is desirable in many cases to fabricate the structures 251 and 252 using 3D filament of different colors so that they can be easily identified by the student when viewing the finished structure through the ballistic gel. Thus, for example, nerve structures might be green, discs may be blue, vertebrae are white, and vascular structures are red. The invention is not limited to any particular set of colors, however.

Example materials that may be used for fabrication of the various components include the following non-limiting list: NINJATEK CHEETAH flexible TPU filament (sapphire, grass, and red colors); STRATASYS ABSplus-P430 ABS filament (white); and STRATASYS SR-35 soluble support material (ivory).

Figure 2A:
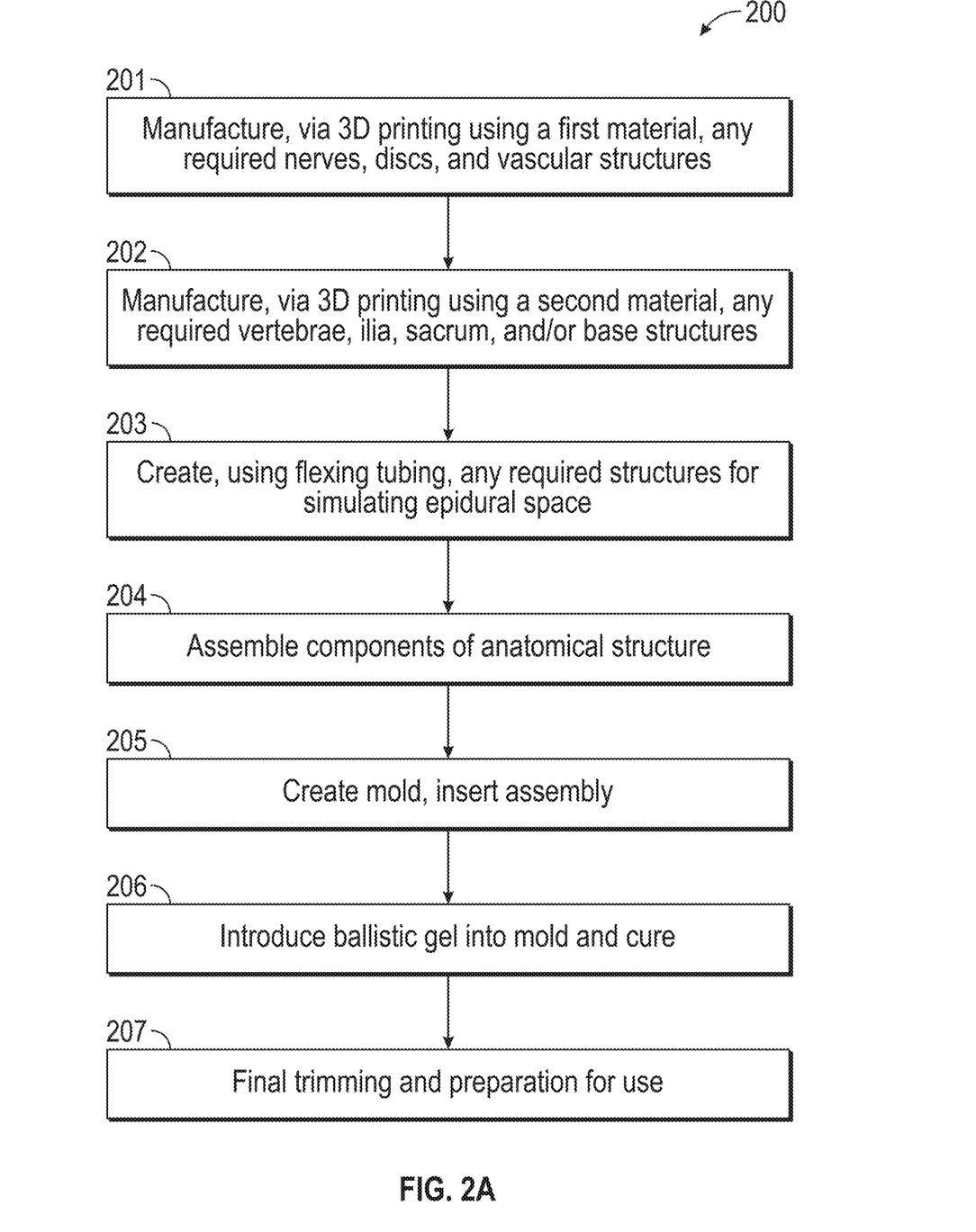
FIGS. 2A and 2B together illustrate the manufacturing of an injection training model in accordance with various embodiments.
Figure 2B:
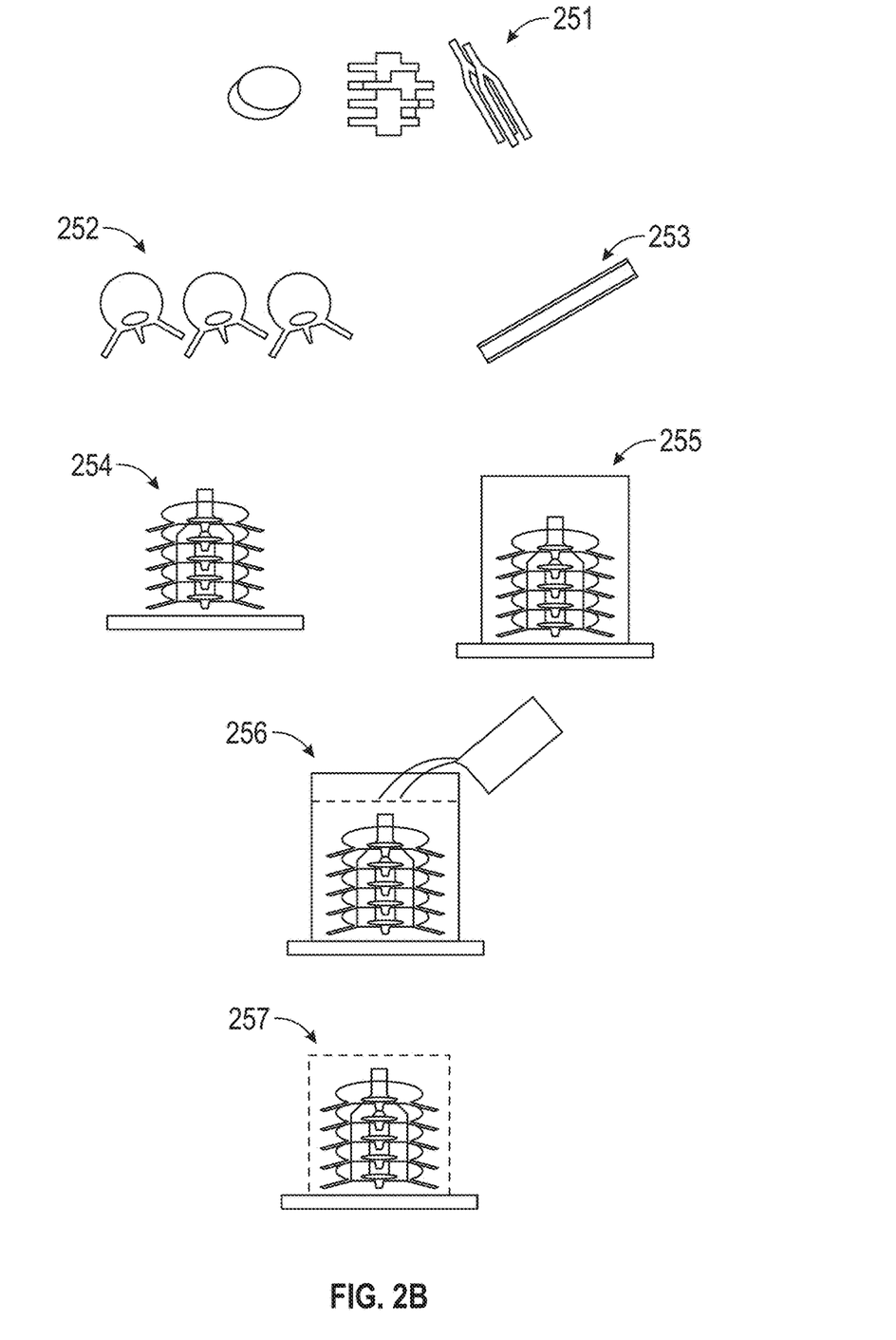

With continued reference to FIGS. 2A and 2B, the process continues at step 203 with the fabrication, if required, of a structure or structures (253) for simulating an epidural space. An example of such a structure (i.e., a water-filled silicone tube segment) is described below in conjunction with FIG. 12.

Next, at step 204, the various components 251, 252, and 253 are assembled (254) using an appropriate combination of adhesives and/or fasteners, depending upon the nature of the model. While not illustrated, it will be appreciated that the 3D-printed parts may be trimmed, sanded, or otherwise finished to assist in assembly and to achieve anatomically realistic geometries.

At step 205, an appropriately sized mold (255) is created. In some embodiments, for example, a cylindrical, metallic structure is formed such that it has a diameter that is just slightly larger than the anatomical assembly. Next, at step 206, the inorganic ballistic gel is prepared and poured, in liquid form, into the mold (256). The preparation of the ballistic gel will vary depending its precise composition. In one embodiment, the ballistic gel is a synthetic, inorganic, "#0 medical gel" provided in solid form that is first cut into uniform segments and then heated gently at approximately 250 F for 3.0 to 5.0 hours prior to pouring into the mold. The resulting gel form is then cured and or cooled for approximately 12 hours before final trimming (step 207) to form the finished model (257).

Figure 3:
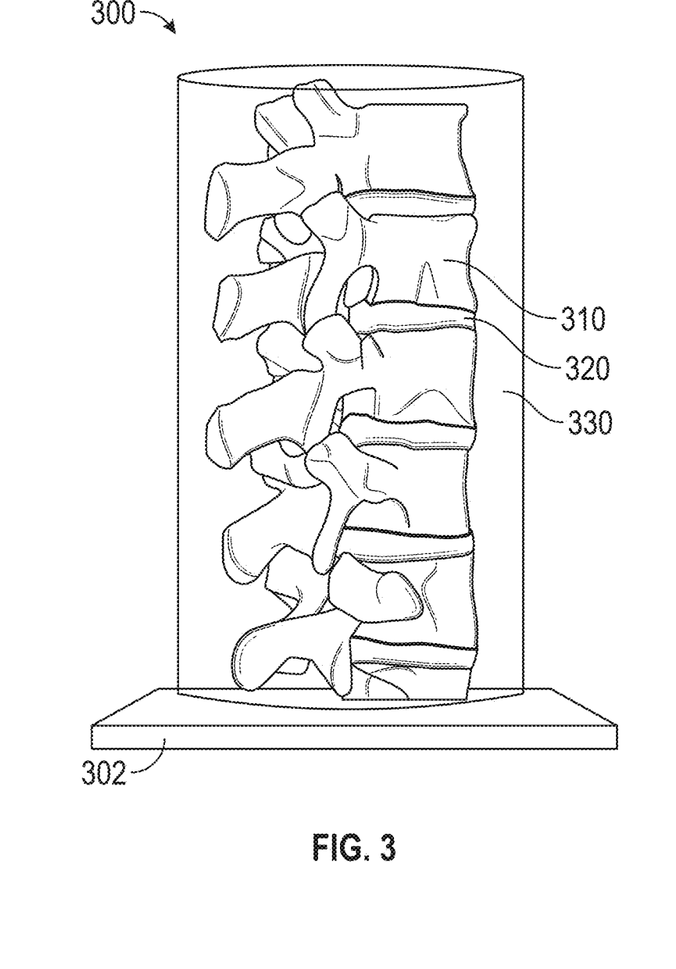
FIGS. 3-5 illustrate examples of lumbar, cervical, and pelvic injection models, respectively.
Figure 4:
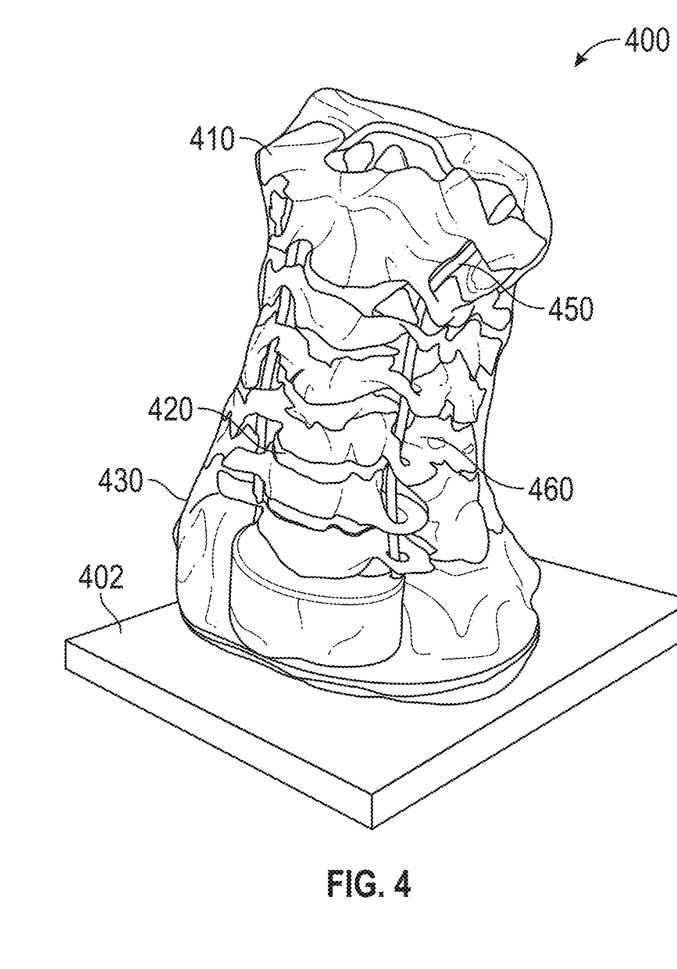
Figure 5:
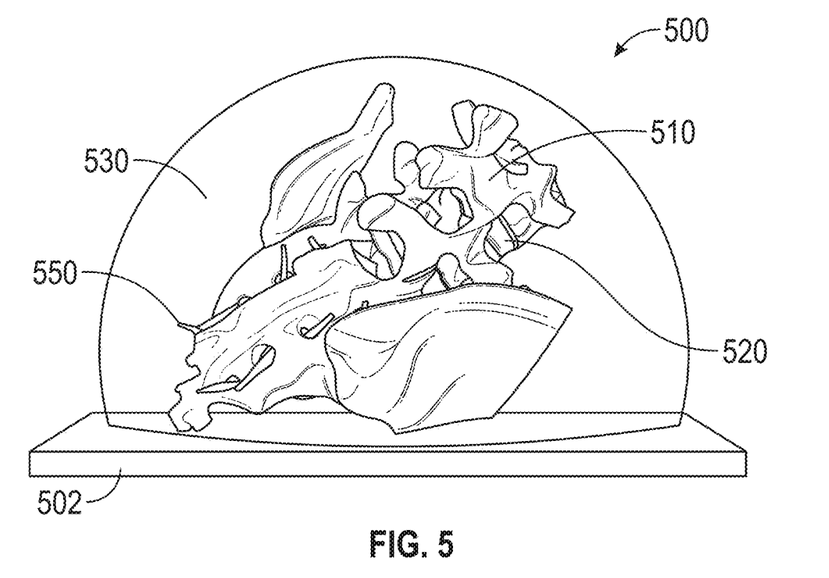

While the present invention is not limited to any particular anatomical features or injection scenarios, FIGS. 3-5 illustrate just a few example embodiments (e.g., lumbar, cervical, and pelvic injection models). More particularly, FIG. 3 illustrates a lumbar model 300 that includes a base 302, a ballistic gel material 330, and an internal anatomical structure including an alternating series of vertebrae 310 and discs 320. Note that the respective colors of the components have been selected to provide a contrast that can be seen by the student through the relatively transparent gel 330.

FIG. 4 illustrates a cervical model 400 including a base 402, gel material 430, and an internal anatomical structure including discs 420, vertebrae 410, nerves 460, and vascular structure 450. Similarly, FIG. 5 illustrates a pelvic model including a base 502, a gel material 530, ilia/sacrum structure 510, discs 520, and vascular structure 550.

As mentioned above, one of the benefits of systems in accordance with the present invention is reusability. That is, it has been found that the inorganic ballistic gel structure can be easily re-melted in various ways to effectively any signs of previous needle marks. For example, the gel may be removed from the model, reheated, and recast in the mold. Alternatively, a localized plug of gel may be scooped out in an area that encloses the track marks, reheated, and the poured back into the scooped-out area. Yet another method includes using a heat gun to melt and seal up the gel/track marks. This technique has some limitations, as the heat gun cannot penetrate to the depths of the track marks, but it can be utilized for cosmetic purposes to remove superficial track marks.

Figure 6:
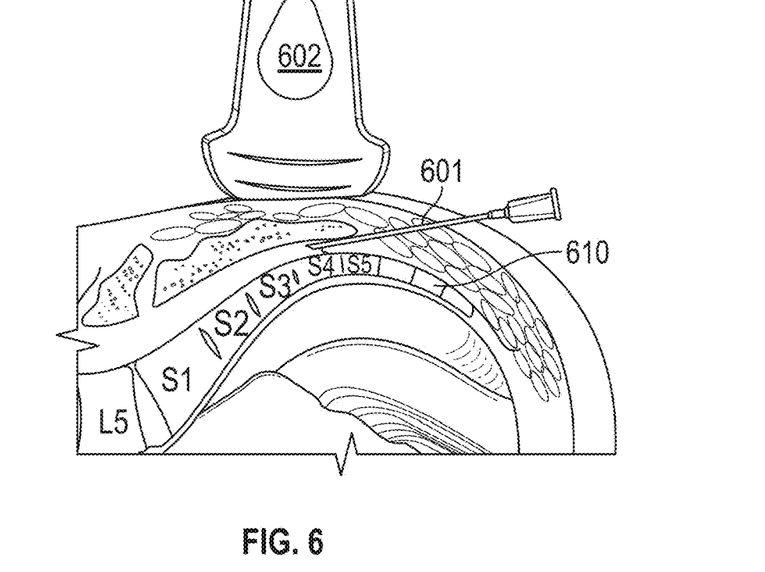
FIGS. 6 and 7 illustrate various examples of injection procedures that can be simulated using the models described herein.
Figure 7:
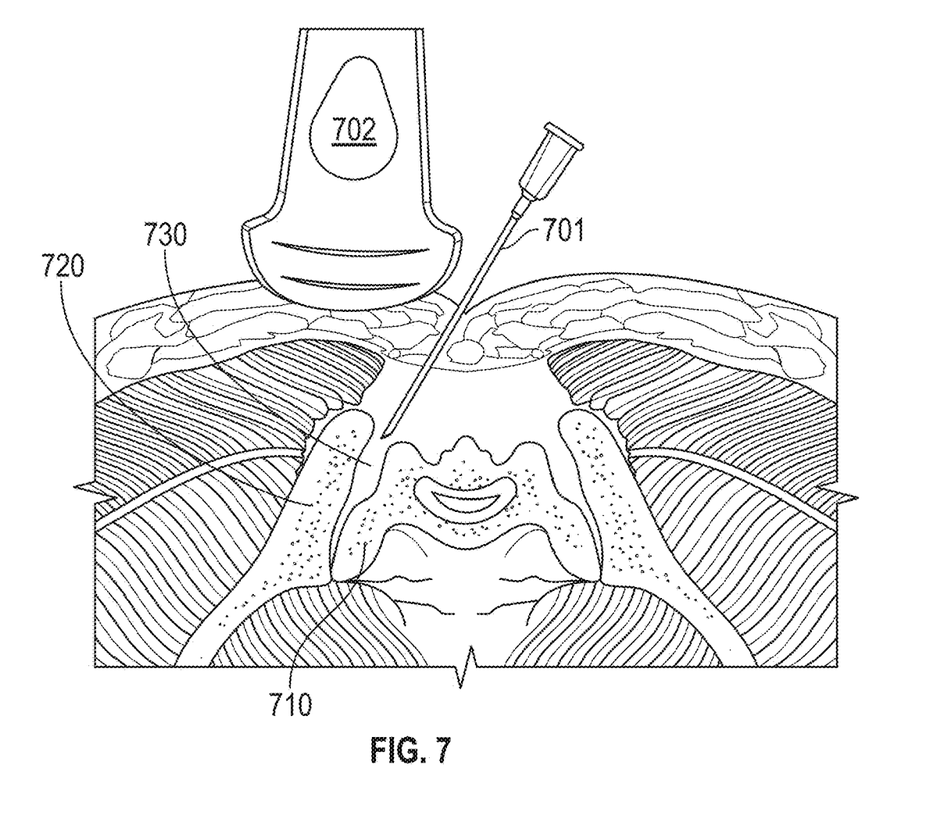

While the models described herein can be used to simulate a wide range of procedures, FIGS. 6 and 7 illustrate just two examples of injection procedures. Specifically, FIG. 6 illustrates the insertion of a needle 601 in conjunction a sacroiliac injection adjacent coccyx 610 while monitoring using an ultrasonic transducer 602, while FIG. 7 illustrates the insertion of a needle 701 in connection with a caudal-epidural joint injection (730) between the sacrum 710 and ilium 720 while monitoring via ultrasonic transducer 702.

Figure 8:
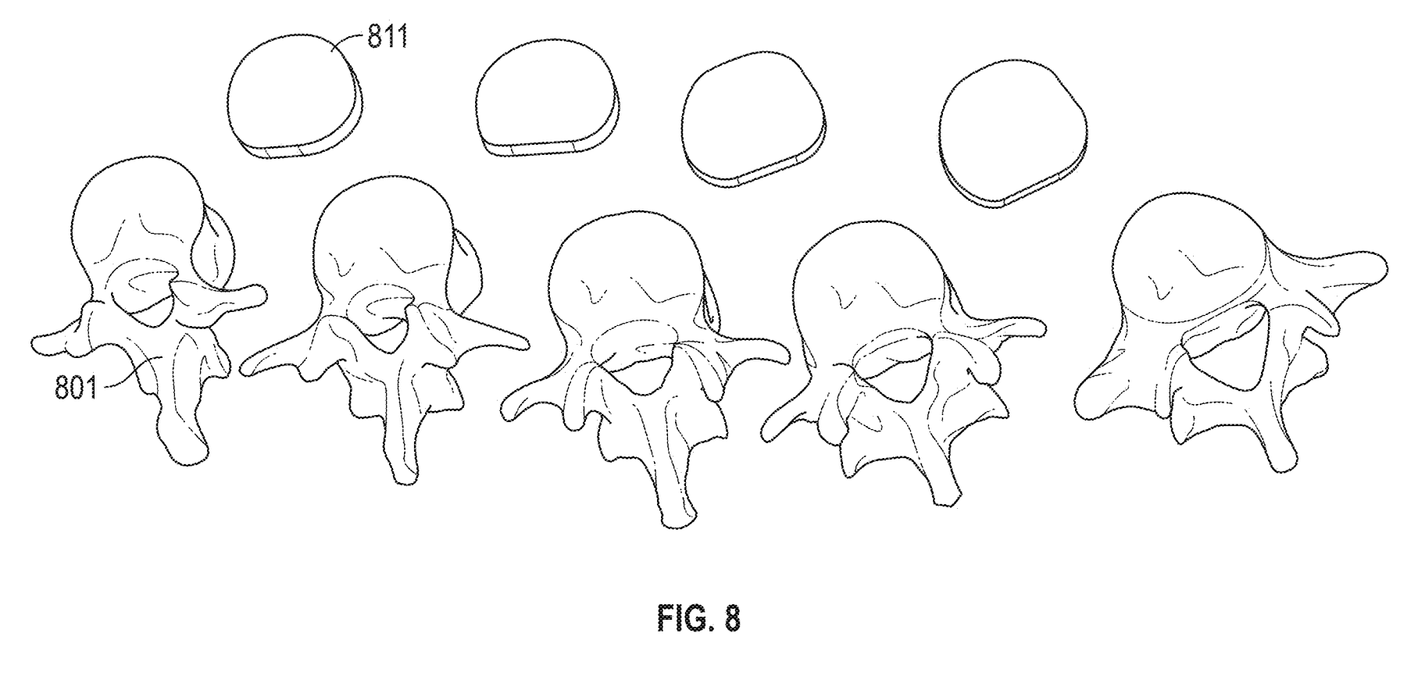
FIG. 8 illustrates example 3D-printed discs and vertebrae to be assembled to form a lumbar model in accordance with various embodiments.
Figure 9:
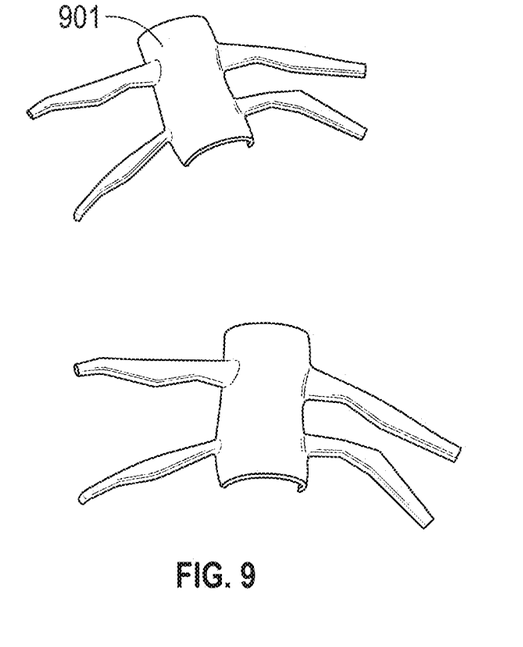
FIG. 9 illustrates example 3D-printed nerves in accordance with various embodiments.
Figure 10:
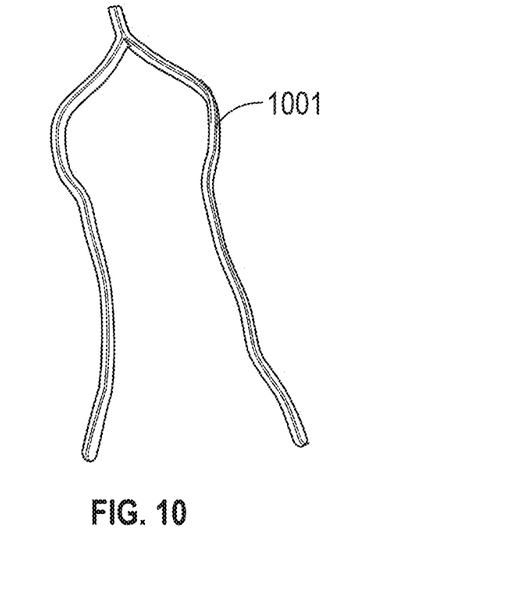
FIG. 10 illustrates an example 3D-printed vascular structure in accordance with various embodiments.

FIG. 8 illustrates example 3D-printed discs and vertebrae to be assembled to form a lumbar model in accordance with various embodiments. That is, FIG. 8 shows four 3D-printed TPU discs 811 and five 3D-printed ABS vertebrae 801. Similarly, FIG. 9 illustrates example 3D-printed nerves 901 in accordance with various embodiments. As mentioned above, nerves 901 may be printed using a TPU filament or other similarly flexible material, and may be based on existing anatomic models converted to CAD files for 3D printing. FIG. 10 illustrates an example 3D-printed TPU vascular structure 1001 in accordance with various embodiments.

Figure 11:
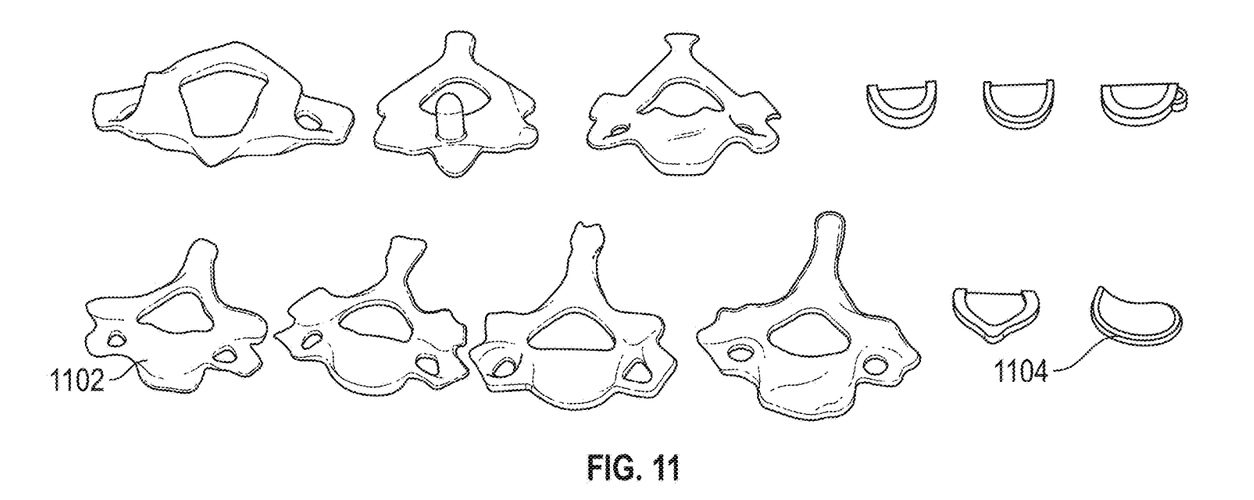
FIG. 11 illustrates example 3D-printed discs and vertebrae to be assembled to form a cervical model in accordance with various embodiments.

FIG. 11 illustrates example 3D-printed discs 1104 and vertebrae 1102 to be assembled to form a cervical model in accordance with various embodiments. That is, referring to FIG. 13, the finished structure (prior to molding) includes vascular structure 1001, vertebrae 1102, discs 1104, and nerves 901.

Figure 12:
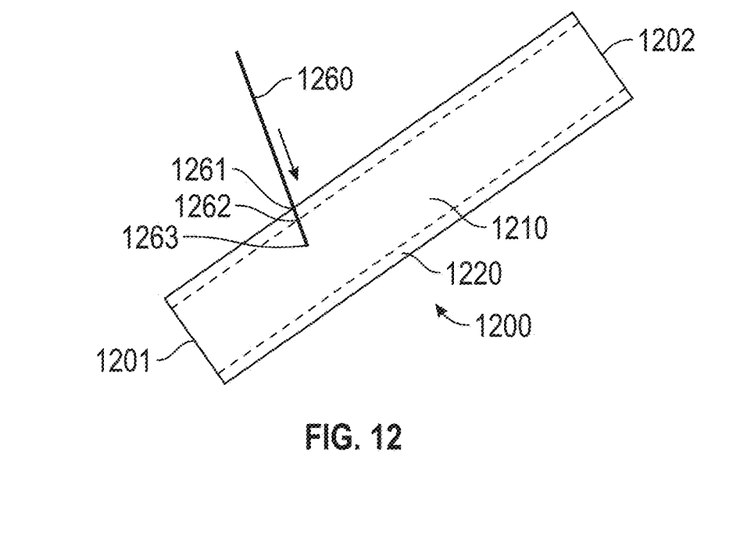
FIG. 12 illustrates a tubular structure including an air-filled or fluid-filled space in accordance with various embodiments.
Figure 13:
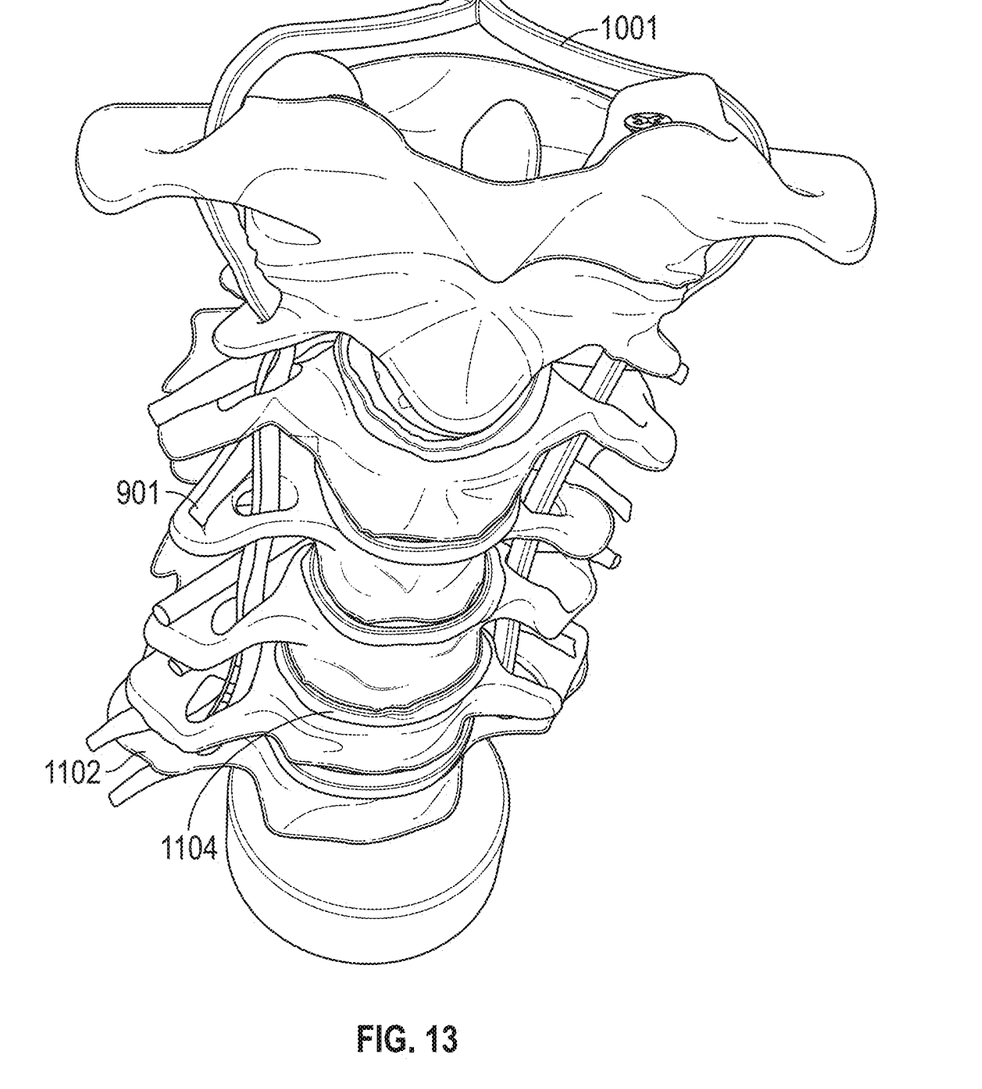
FIG. 13 illustrates an assembled cervical model prior to molding in accordance with various embodiments.

FIG. 12 illustrates a tubular structure configured to simulate a thecal sac or an epidural space of the type that may be inserted, for example, within the cervical model illustrated in FIG. 13. Specifically, as shown in FIG. 12, the structure 1200 includes a tubular body 1220 (comprising, for example, a silicone material) having an internal chamber 1210 that may be filled with air (or some other gas) or a liquid (e.g., water). The first end 1201 and second end 1202 of structure 1200 are suitably sealed (e.g., via plugs, pinching, an adhesive, clear silicone caulk, or the like) to form the finished structure 1200, which the present inventors have determined provides a uniquely realistic simulation. That is, when inserting needle 1260, the student feels the initial resistance when the tip contacts point 1261, then constant force feedback until the needle reaches the inner diameter at 1262, followed by a sudden reduction of required force when the tip reaches the interior at 1263. As mentioned previously, the use of water or another liquid within chamber 1210 effectively simulates the thecal sac, and can be used for training lumbar puncture procedures and spinal anesthesiology. Alternatively, by filling chamber 1210 with air (or another gas), the epidural space can be simulated for the purposes of practicing epidural injection procedures. In one embodiment, structure 1200 is silicone tubing having a ⅜" inner diameter and a half-inch outer diameter.

In summary, what has been described is an improved, cost-effective, and realistic injection training model that utilizes a clear, reusable inorganic ballistic gel and novel internal components that have proven to be beneficial in real-world testing. That is, the present inventors have assessed the comfort levels of medical students and residents when performing injection techniques using the embodiments described herein and found that both students and residents overwhelmingly found that the models were easy to use and helped them better understand the corresponding procedure. Survey data shows that users considered the 3D-printed models to be reasonable alternatives to commercial models, were a useful tool for injection training, and increased their comfort level with the corresponding injection procedures. Furthermore, models in accordance with the present invention may be used to simulate a variety of body types and conditions, and therefore overcomes the limitations of currently known commercial trainers that generally only provide learning in the context of one body type.

As used herein, the word "exemplary" means "serving as an example, instance, or illustration." Any implementation described herein as "exemplary" is not necessarily to be construed as preferred or advantageous over other implementations, nor is it intended to be construed as a model that must be literally duplicated.

While the foregoing detailed description will provide those skilled in the art with a convenient road map for implementing various embodiments of the invention, it should be appreciated that the particular embodiments described above are only examples, and are not intended to limit the scope, applicability, or configuration of the invention in any way. To the contrary, various changes may be made in the function and arrangement of elements described without departing from the scope of the invention.

What is claimed is:

1. An injection training model comprising:
a base structure;
an anatomical subassembly mechanically secured to the base, the anatomical subassembly comprising a first set of 3D-printed components manufactured from a first material, and a second set of 3D-printed components manufactured from a second material, wherein the second material has a greater stiffness than the first material;
a transparent, repairable, inorganic ballistic gel structure that encapsulates the anatomical subassembly and is in contact with the base structure.

2. The injection training model of claim 1, wherein the anatomical subassembly includes a human lumbar structure, the first set of 3D-printed components includes a plurality of vertebrae, and the second set of 3D-printed components includes a plurality of lumbar discs.

3. The injection training model of claim 1, wherein the anatomical subassembly includes a human cervical structure, the first set of 3D-printed components includes a plurality of vertebrae, and the second set of 3D-printed components includes a plurality of lumbar discs, at least one vascular structure, and a plurality of nerve structures.

4. The injection training model of claim 1, wherein the anatomical subassembly includes a human pelvic structure, the first set of 3D-printed components includes a plurality of pelvic bones, and the second set of 3D-printed components includes a plurality of discs, at least one vascular structure, and a plurality of nerve structures.

5. The injection training model of claim 1, wherein the anatomical subassembly further includes a thecal sac structure comprising a sealed tubular body having an inner chamber substantially filled with a liquid.

6. The injection training model of claim 5, wherein the tubular body comprises silicone and has an outer diameter of about ½", and an inner diameter of about ⅜".

7. The injection training model of claim 6, wherein the inner chamber is filled with water.

8. The injection training model of claim 1, wherein at least a portion of the first set of 3D-printed components is manufactured using acrylonitrile butadiene styrene (ABS).

9. The injection training model of claim 1, wherein at least a portion of the second set of 3D-printed components is manufactured using thermoplastic polyurethane (TPU).

10. The injection training model of claim 1, wherein the ballistic gel structure is configured such that at least a portion of internal damage can be substantially repaired through the selective re-melting of the ballistic gel structure.

11. A method of forming an injection training model, the method comprising:
providing a base structure;
providing an anatomical subassembly comprising a first set of 3D-printed components manufactured from a first material, and a second set of 3D-printed components manufactured from a second material, wherein the second material has a greater stiffness than the first material;
mechanically securing the anatomical subassembly to the base; and
molding a transparent, repairable, inorganic ballistic gel structure such that it encapsulates the anatomical subassembly and is in contact with the base structure.

12. The method of claim 11, wherein the anatomical subassembly includes a human lumbar structure, the first set of 3D-printed components includes a plurality of vertebrae, and the second set of 3D-printed components includes a plurality of lumbar discs.

13. The method of claim 11, wherein the anatomical subassembly includes a human cervical structure, the first set of 3D-printed components includes a plurality of vertebrae, and the second set of 3D-printed components includes a plurality of lumbar discs, at least one vascular structure, and a plurality of nerve structures.

14. The method of claim 11, wherein the anatomical subassembly includes a human pelvic structure, the first set of 3D-printed components includes a plurality of pelvic bones, and the second set of 3D-printed components includes a plurality of discs, at least one vascular structure, and a plurality of nerve structures.

15. The method of claim 11, wherein the anatomical subassembly further includes a thecal sac structure comprising a sealed tubular body having an inner chamber substantially filled with a liquid.

16. The method of claim 15, wherein the sealed tubular body comprises silicone and has an outer diameter of about ½", and an inner diameter of about ⅜".

17. The method of claim 16, wherein the inner chamber is filled with water.

18. The method of claim 11, wherein at least a portion of the first set of 3D-printed components is manufactured using acrylonitrile butadiene styrene (ABS).

19. The method of claim 11, wherein at least a portion of the second set of 3D-printed components is manufactured using thermoplastic polyurethane (TPU).

20. The method of claim 11, wherein the ballistic gel structure is configured such that at least a portion of internal damage can be substantially repaired through the selective re-melting of the ballistic gel structure.

* * * * *